United States Patent [19]
Kusuda et al.

[11] Patent Number: 4,840,028
[45] Date of Patent: Jun. 20, 1989

[54] PURIFIER OF DIESEL PARTICULATES IN EXHAUST GAS

[75] Inventors: Takao Kusuda, Ashiya; Masaaki Yonemura, Nara; Hisanori Shimoda, Suita; Masuo Takigawa, Ikoma; Toshihiro Mihara, Hirakata, all of Japan

[73] Assignee: Matsushita Electric Industrial Co., Ltd., Osaka, Japan

[21] Appl. No.: 170,437

[22] Filed: Mar. 15, 1988

[30] Foreign Application Priority Data

| Mar. 20, 1987 | [JP] | Japan | 62-66410 |
| Mar. 20, 1987 | [JP] | Japan | 62-66411 |
| Aug. 20, 1987 | [JP] | Japan | 62-206702 |

[51] Int. Cl.$^4$ ............................................. F01N 3/02
[52] U.S. Cl. ............................... 60/303; 60/288; 137/597; 137/876
[58] Field of Search ............ 60/286, 288, 303; 137/597, 876

[56] References Cited

U.S. PATENT DOCUMENTS

| 4,169,491 | 10/1979 | Bajka | 137/876 |
| 4,372,337 | 2/1983 | Holtzenberger | 137/876 |
| 4,373,330 | 2/1983 | Stark | 60/303 |
| 4,381,643 | 5/1983 | Stark . | |
| 4,566,628 | 1/1986 | Latarius | 137/597 |

FOREIGN PATENT DOCUMENTS

| 0087067 | 8/1983 | European Pat. Off. . |
| 0121445 | 10/1984 | European Pat. Off. . |
| 0207446 | 1/1987 | European Pat. Off. . |
| 3204176 | 8/1983 | Fed. Rep. of Germany . |
| 8701816 | 5/1987 | Fed. Rep. of Germany . |
| 958836 | 12/1947 | France . |
| 2300277 | 9/1976 | France . |
| 118514 | 9/1981 | Japan . |
| 79209 | 5/1982 | Japan | 60/303 |
| 101210 | 6/1983 | Japan . |
| 11415 | 1/1986 | Japan . |

OTHER PUBLICATIONS

Patent Abstracts of Japan, vol. 10, No. 29 (M-451) Feb. 5th, 1986.

*Primary Examiner*—Douglas Hart
*Attorney, Agent, or Firm*—Spencer & Frank

[57] ABSTRACT

An exhaust gas filtering element is provided for filtering diesel particulates. The system comprises two filter elements disposed parallel to each other, a burner mechanism, and a four-way valve mechanism for switching over an exhaust gas flow and a preheated gas flow obtained by combustion in the burner mechanism. The exhaust gas flow is generally passed uniformly through the two filter elements which filter off particulates. However, when regeneration is required, an ellipitical vane, provided in a cylinder of the four-way valve mechanism, is rotated so as to cut off the exhaust gas flow passing through one of the filter elements and cause the preheated gas to flow through this filter, whereby particulates are oxidized and incinerated. At this time, the exhaust gas flow is passed through the other filter element, without any particulates being emitted into the atmosphere. Then, the exhaust gas flow and the preheated gas flow are switched by rotating the vane so that the other filter element is regenerated.

7 Claims, 4 Drawing Sheets

FIG. I

PURIFIER OF DIESEL PARTICULATES IN EXHAUST GAS

BACKGROUND OF THE INVENTION

1. Field of the Invention

The present invention relates to a filter apparatus which is mounted on an internal-combustion engine, particularly on a diesel engine, that captures and removes particulates such as soot exhausted from the engine so as to purify the exhaust gas, thereby preventing environmental pollution.

2. Description of Prior Art

The exhaust of particulates from diesel engines has recently been controlled because it contains carcinogens and because it causes a deterioration in visibility. As a measure against such exhaust particulates, a method has been investigated in which a heat-resistant filter is provided in an intermediate position of an exhaust pipe to remove particulates by filtering them out. This method is characterized by a filter element which can be regenerated and repeatedly used by being incinerated after particulates have been accumulated therein. There have been many proposals in which a burner for regenerating the filter is provided upstream of the filter element to ensure that the temperature of the exhaust gas is increased to the ignition temperature of the particulates by using the combustion heat of the burner. Such a method must increase the temperature of a large amount of gas exhausted from the engine, and thus it requires an enormous quantity of heat.

There has also been a proposal for solving the above-described problem in which the route of exhaust gas is branched at a filter element, and a bypass that is separated from the filter element is provided therein so that the exhaust gases from the engine are passed through the bypass by a valve when the burner is operating. This method obviates the need for heating a large amount of exhaust gas (Japanese Patent Laid-Open No. 118514/1981). This apparatus is provided with a bypass in the filter element of the exhaust gas route and exhausts the gas through the bypass during regeneration, thereby reducing by half, the effect of controlling the exhaust of particulates.

In addition, an apparatus has been proposed in which an exhaust gas inlet of a filter element is divided into two portions and is provided with a switching plate in such a way that the filter element is divided into a regeneration side and an exhaust gas side by the switching plate during regeneration (Japanese Patent Laid-Open No. 101210/1983). In this apparatus, since the regeneration portion and the portion through which the exhaust gas flow coexist in the one filter during regeneration, large thermal stresses occur, which readily lead to the fracture of the filter element.

Prior art with respect to a combustion apparatus for vehicles is also described in Japanese Patent Laid-Open No. 11415/1986.

SUMMARY OF THE INVENTION

It is an object of the present invention to provide a compact exhaust gas purifier which is extremely economical, which exhausts no particulates during regeneration, and can control to a small amount of the combustion of a burner without exhausting particulates during regeneration.

To achieve this end, an exhaust gas purifier of the present invention comprises two filter elements connected in parallel, a burner having a small combustion chamber which has excellent heat resistance, and a four-way valve for switching the route of exhaust gas. A filter element which has a small heat capacity and a corrugated honeycomb form and is made of fiber ceramics obtained by sintering heat-resistant inorganic fiber and clay is used as each of the filter elements in the purifier.

When the filter elements must be regenerated, one of the filter elements is removed from the inflow of the exhaust gas by the four-way valve and is heated by the burner, while the exhaust gas containing particulates continue to pass through the other filter element.

DESCRIPTION OF THE PREFERRED EMBODIMENTS

Figure 1:
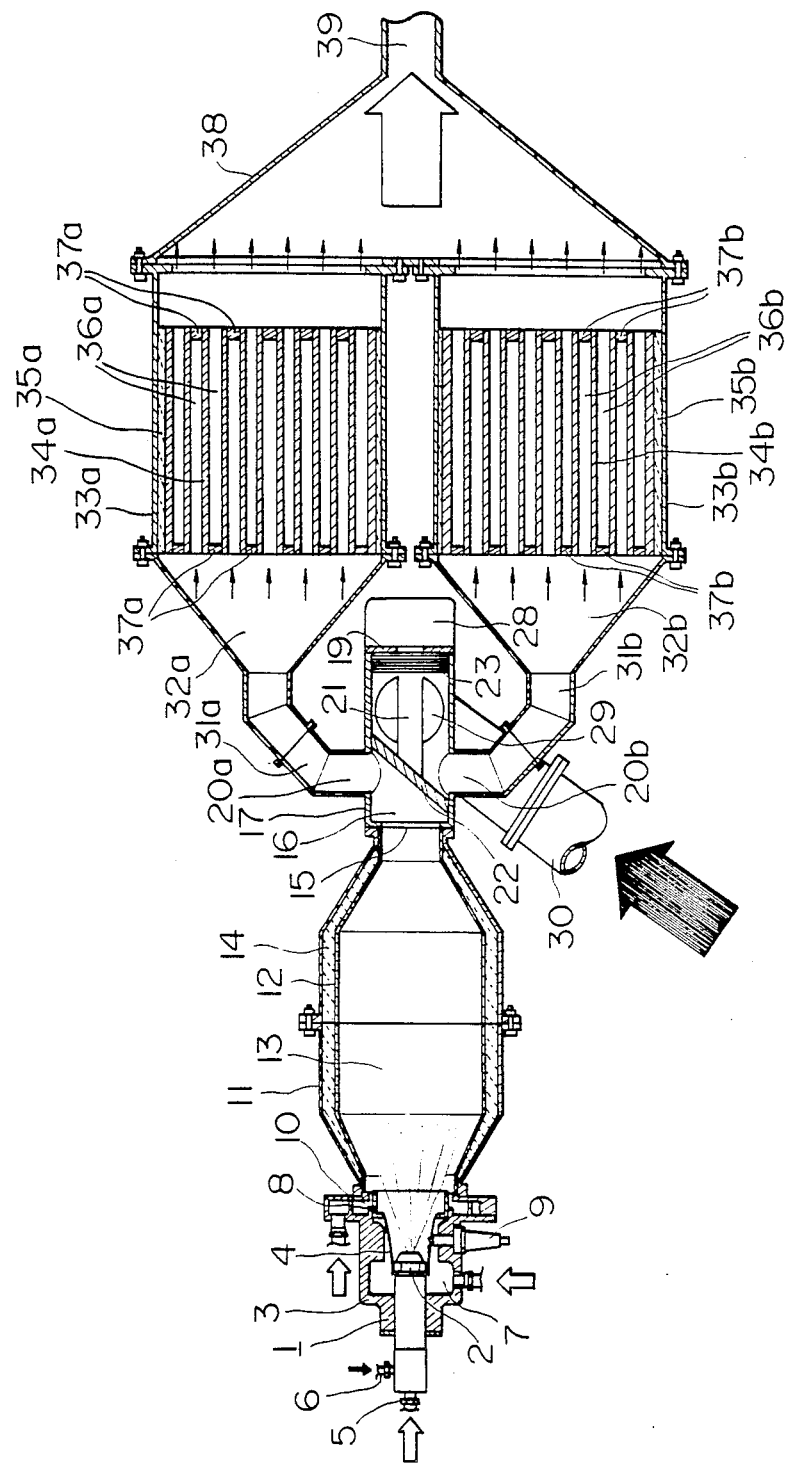
FIG. 1 is a sectional view of an embodiment of an exhaust gas purifier for diesel particulates.

In an exhaust gas purifier of the present invention, two gas outlets of a four-way valve are connected to two filter elements which are received in a case, and one of two gas inlets thereof is connected to an exhaust pipe from an engine and the other is connected to a combustion chamber. This four-way valve switches over a gas flow through one of the filter elements from the exhaust gas from the engine to preheated gas from a burner to provide regeneration.

The operation of this exhaust gas purifier is described below.

During the normal operation of the engine, an elliptical vane of the four-way valve is at a neutral position with respect to the two gas outlets, so that the exhaust gas flowing into the four-way valve flows to the filter elements from the respective gas outlets, with the particulates being filtered off and the purified exhaust gas being exhausted to the air.

When particulates have accumulated in the filter elements so that they must be regenerated, the elliptical vane in the four-way valve is moved so that one of the gas outlets communicates with the gas inlet connected to the exhaust pipe from the engine, and the other communicates with the gas inlet connected to the combustion chamber. The former gas outlet leads the exhaust gas to the corresponding filter element to continue capturing particulates, and the latter gas outlet leads preheated gas from the burner, which has started combustion, to the other filter element to regenerate it. After one of the filter elements has been completely regenerated, the elliptical vane is rotated so as to cause the exhaust gas to flow through the filter element which has been regenerated and the preheated gas to flow through the other filter element to regenerate it. Therefore, no particulates are exhausted to the air during the regeneration. Further the preheated gas from the burner is supplied to the filter elements after being agitated by the four-way valve so that its temperature becomes uniform and it thus heats the filter elements uniformly, and no large thermal stresses occur so that the filter elements do not rupture.

The exhaust gas purifier of the present invention allows an engine to be operated with a very low back pressure during normal operation in which the two filter elements are being used, and thus it can maintain the engine power with only a small penalty, and be an effective purifier which does not exhaust unpurified exhaust gas to the air during regeneration. In addition, since the exhaust gas from the engine and the combustion gas from the burner are isolated from each other by the four-way valve, the exhaust gas is not unnecessarily heated. Furthermore, since filter elements made of fiber ceramics with a small heat capacity are used, the size of the burner can be greatly reduced, resulting in the possibility of a great reduction in fuel consumption. Since the temperature gradient produced when the filter elements are heated is also very small, and thus does not create any problems concerning fracture and melting, regeneration can be economically and safely performed.

First Embodiment

A first embodiment of the present invention is described below.

FIG. 1 shows a first embodiment of the present invention in which a burner 1, a nozzle 2, a burner body 3 and a stabilizer 4 are shown. The nozzle 2 has an atomization air supply 5 and a fuel supply 6 which are connected to an air compressor and an oil pump (both not shown), respectively. The burner body 3 has a combustion air supply 7 which has an annular shape that is concentric with the nozzle 2. The stabilizer 4, which has a funnel shape, extends from the combustion air supply 7 to a position in front of the nozzle 2. The stabilizer 4 is provided with a swirler 8. A spark plug 9 connected to an induction coil (not shown) passes through the burner body 3 and the stabilizer 4 to a position near the nozzle 2. An annular intake air supply 10 is provided around the peripheral surface of the stabilizer 4 in the vicinity of the top of the burner body 3.

A combustion chamber 13 comprising an outer sleeve 11 and an inner sleeve 12 is connected to the front of the burner 1. A thermal insulator 14 made of ceramic fibers is charged between the outer sleeve 11 and the inner sleeve 12. The side of the combustion chamber 13 opposite the burner 1 is connected to a preheated air inlet 15 of a four-way valve 16.

Figure 2:
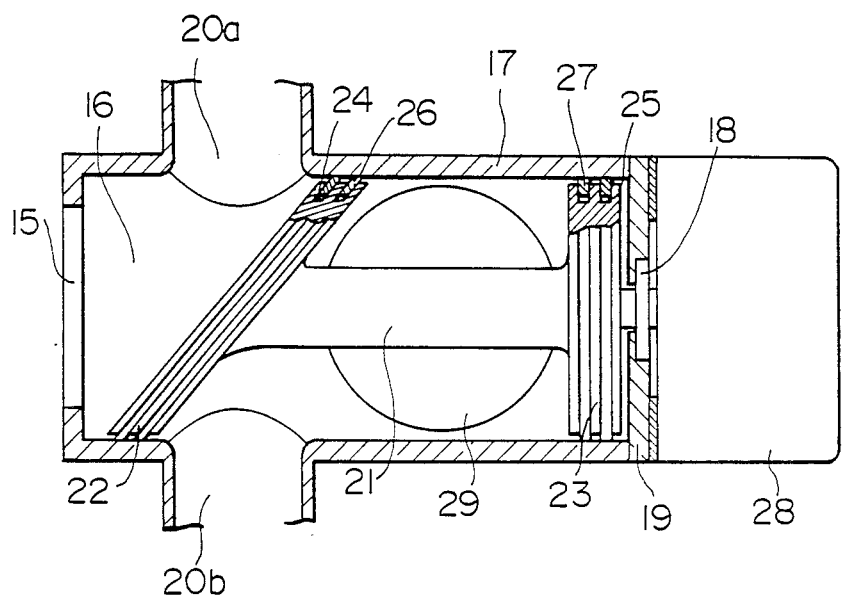
FIG. 2 is a sectional view of a four-way valve of the present invention.

FIG. 2 is a sectional view of the four-way valve 16.

One side of a cylinder 17 is includes an opening forming a preheated air inlet to the combustion chamber 13, and the other end is closed by a back cover 19 provided around a bearing 18. Gas outlets 20a, 20b open at positions located a distance of one-third of the length of the cylinder from the preheated air inlet 15 so as to be opposite to each other in the direction perpendicular to the axis of the cylinder 17. A shaft 21 is inserted into the cylinder 17, passing through the bearing 18, so as to be coaxial with the cylinder 17. An elliptical vane 22 is fixed to one end of the shaft 21, and a cylindrical vane 23 is fixed to the other end of the shaft 21, near the back cover 19 in the cylinder 17. The elliptical and cylindrical vanes 22, 23 are provided with slots 24, 25, respectively, around their peripheries, and elliptical and circular rings 26, 27 for sealing are inserted into the slots 24, 25, respectively. The part of the shaft 21 passing through the bearing 18 is connected to a motor 28. A gas inlet 29 opens at the cylinder 17 in a position between the elliptical vane 22 and the cylindrical vane 23, and is connected to an exhaust pipe 30 from the engine.

In FIG. 1, connection pipes 31a, 31b are connected to the gas outlets 20a, 20b, respectively, and funnel-shaped inlet covers 32a, 32b and cylindrical cases 33a, 33b are connected to the connection pipes 31a, 31b, respectively, in such a manner that they are parallel to the axis of the cylinder 17. The cases 33a, 33b receive filter elements 34a, 34b, respectively, the peripheries of which are covered with mounting mats 35a, 35b, that are mainly composed of ceramic fibers capable of thermal expansion. The filter elements 34a, 34b each have a corrugated honeycomb skeletal structure made of a fiber ceramic formed by sintering alumino-silicate fiber and clay and they have a large number of cells 36a, 36b that are alternately closed at either end by plugs 37a, 37b, respectively. The cases 33a, 33b are connected to an exhaust pipe 39 through an exhaust outlet cover 38.

The operation the first embodiment is as follows.

During normal operation of the engine, the shorter axis of the ellipse of the elliptical vane 22 in the four-way valve 16 is parallel to the line connecting the opposite gas outlets 20a, 20b, i.e., in a state wherein the four-way valve 16 is in a neutral position so as to cause all the openings of the cylinder 17 to communicate with each other. In this case, the exhaust gases from the engine are branched to the connection pipes 31a, 31b from the gas outlets 20a, 20b, respectively, of the four-way valve 16, and thus enter and are dispersed over the entire surfaces of the filter elements 34a, 34b by the inlet covers 32a, 32b. At the same time, the particulates contained in the exhaust gases are filtered off by and accumulate in the walls of the cells that are made of porous fiber ceramics. The filtered exhaust gases are then passed as clean gases through the outlet cover 38, to the exhaust pipe 39, and are finally exhausted to the air. During this operation, air continuously flows from the combustion air supply 7 and/or the intake air supply 10 of the burner 1 so that no exhaust gases enter the burner 1. During this time, atomization air and fuel are cut off at an intermediate position of the path by a solenoid valve (not shown). The exhaust gases introduced in the four-way valve 16 are prevented from leaking past the back cover 19 by the circular rings 27 provided on the cylindrical vane 23.

The procedure used when the filter elements 34a, 34b must be regenerated because particulates have become accumulated therein is described below.

The motor 28 is first energized to rotate the shaft 21. When the elliptical vane 22 has rotated 90° from its neutral position, the motor is stopped. In this state, the combustion chamber 13 and the exhaust pipe 30 from the engine communicate with the connection pipes 31a and 31b, respectively. Then a high voltage of about 10,000 V is applied to the spark plug 9 to produce an electric discharge with spark at the top thereof. Several seconds later, the solenoid valves which had cut off the atomization air and the fuel are simultaneously opened to supply the air and the fuel under pressure by means of the air compressor and the oil pump, respectively, to the atomizing nozzle 2. The fuel is atomized by the atomization air in the atomizing nozzle 2 and is then blown into the combustion chamber 13. The fuel is then uniformly mixed with combustion air which has been forced into a vortex flow by being passed though the swirler of the stabilizer 4. At this point, the atomized fuel is ignited by the discharge of the spark plug 9 to form a flame. The flame is stabilized in front of the burner 1 by the vortex flow of the stabilizer 4 so that a good combustion state is maintained in the combustion chamber 13. The intake air is blown out from the intake air supply 10 which is provided in the peripheral surface of the stabilizer 4. The air then passes along the inner periphery surface of the combustion chamber 13 while surrounding the flame, and reaches the inlet 15 of the four-way valve 16. The burned gas and the intake air are well mixed during the time they pass through the combustion chamber 13 and the four-way valve 16. As they are passed through, they to form a high-temperature gas which contains a large amount of oxygen and is at a controlled temperature. This gas mixture is then passed to the inlet cover 32a through the connection pipe 31a. The high-temperature gas is uniformly dispersed over the entire surface of the filter element 34a in the inlet cover 32a and flows through the filter element 34a. During this time, the filter element 34a and the particulates accumulated therein are heated to about 600° C. which starts incinerating the particulates. The burned gas generated by the combustion is passed through the outlet cover 38 and is exhausted to the air through the exhaust pipe 39. The temperature of the preheated gas can be controlled by controlling the amount of combustion in the burner 1 or the amount of intake air, or by controlling both amounts, whereby the oxygen content is controlled. The exhaust gas from the engine is passed through the gas inlet 29, between the elliptical vane 22 and the cylindrical vane 23, and flows into the inlet cover 32b through the other connection pipe 31b while cooling the elliptical vane 22 and the shaft 21 which are at a high temperature because of the preheated gas. The exhaust gas continues to be filtered by the filter element 34b, with particulates being accumulated in the cells 36b. After this process has been completed over a period of several minutes, the motor is inversely energized so as to reverse the shaft 21 by 180°. In this state, the combustion chamber 13 and the gas inlet 29 are communicated with the connection pipes 31b, 31a, respectively, in a manner opposite to the above-described operation. Therefore, the preheated gas from the burner 1 and the exhaust gas from the engine are switched so that the engine exhaust gas is passed through the filter element 34a which has been regenerated by the burning of the particulates therein by the flow of the preheated gas, and the preheated gas is passed through the filter element 34b in which particulates have been accumulated by the flow of the engine exhaust gas. Consequently, the particulates accumulated in the filter element 34b are rapidly heated to 600° C., which is their ignition temperature, and thus the particulates start to become incinerated. At the same time, particulates are again accumulated in the regenerated filter element 34a. After this operation has been completed over a period of several minutes, the motor is again energized to rotate the shaft 21 by 90° and return the elliptical vane 22 to its initial neutral position.

Therefore, the two filter elements are generally operated at the same time, producing extremely low back pressure, and this purifier can thus be operated without imposing any load on the engine. On the other hand, since one of the filter elements is operated for regeneration purposes and the other is operated as a filter during the regeneration, the exhaust gases from the engine are always passed through the filter element 34a or 34b which captures particulates. In addition, since, during regeneration, the preheated gas of the burner 1 carrying out complete combustion passes through the four-way valve 16 and the connection pipe 31a or 31b, and the gas is dispersed over the entire surface of the filter element 34a or 34b in the inlet cover 32a or 32b, the temperature distribution in the filter element 34a or 34b is uniform. Further, since the exhaust gas from the engine is also shut out by the elliptical rings 26 provided in the elliptical vane 22 in the four-way valve 16, the exhaust gas will not be mixed with the preheated gas of the burner 1. Although the four-way valve 16 is heated during the operation of the engine, particularly during the regeneration, the elliptical rings 26 and the circular rings 27 respectively provided in the elliptical vane 22 and the cylindrical vane 23, prevent any leakage of the gas, and prevent stoppage of the rotation of these vanes due to any increase in friction resulting from the difference in thermal expansion between the vanes and the cylinder 17.

Second Embodiment

A second embodiment of the present invention is described below.

Figure 3:
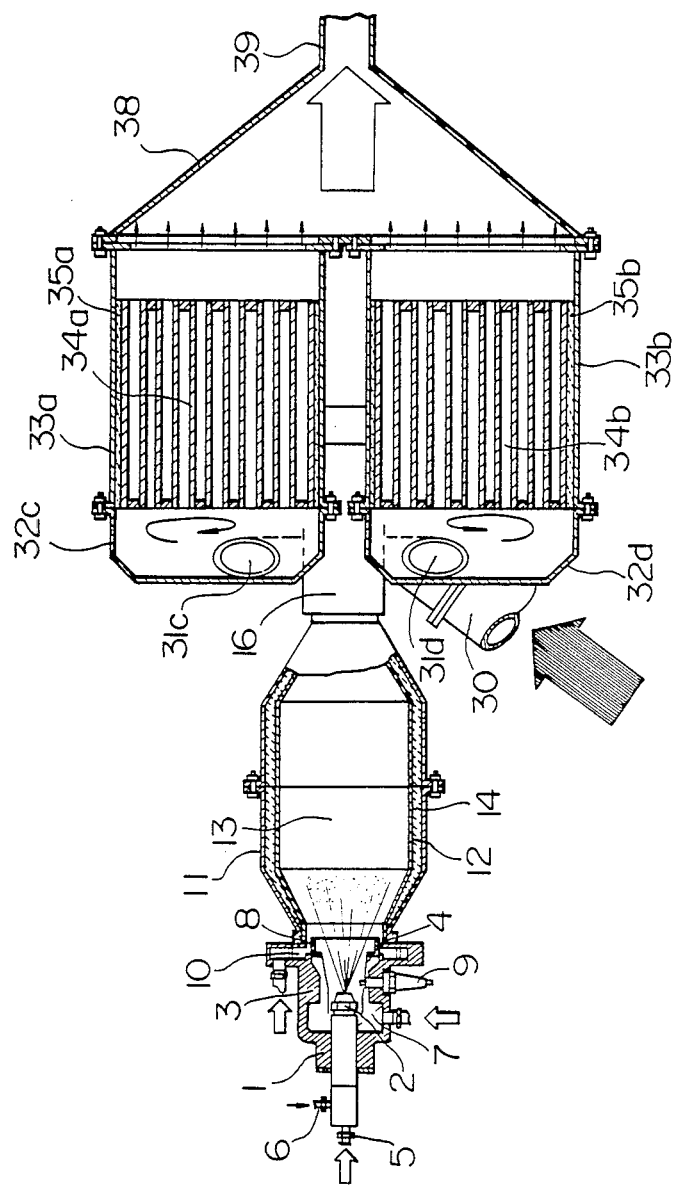
FIG. 3 is a sectional view of a second embodiment of the combustion chamber portion of the present invention.

FIG. 3 is a longitudinal sectional view of another embodiment of the present invention where similar members as those in the first embodiment are denoted by the same reference numerals. In the drawing, reference numerals 32c, 32d denote inlet covers which are provided in front of and on the axes of cases 33a, 33b, respectively, and which are respectively connected to connection pipes 31c, 31d, on the lines tangent to the outer surface of the inlet covers. Consequently, the gas that passes through the connection pipe 31c or 31d and flows into the inlet covers 32c or 32d so that it circulates inside the covers. From the covers 32c or 32d it then passes into the filter element 34a or 34b. Therefore, the exhaust gas from the engine enters the inlet covers 32c or 32d at an angle to the axis of the filter element 34a or 34b during normal operation of the engine, and thus the gas does not directly collide with the front of the filter element 34a or 34b. This helps to prevent the cell walls in the front of the filter element 34a or 34b from becoming deteriorated by hard solids such as scales of iron rust contained in the exhaust gas from the engine. In addition, since, during regeneration, the high-temperature gas is dispersed over the periphery of the filter element 34a or 34b by the vortex flow and this supplies sufficient heat thereto, the temperature in the vicinity of the periphery of the filter element 34a or 34b is not lowered by heat conduction to the mounting mats 35a or 35b.

Third Embodiment

Figure 4:
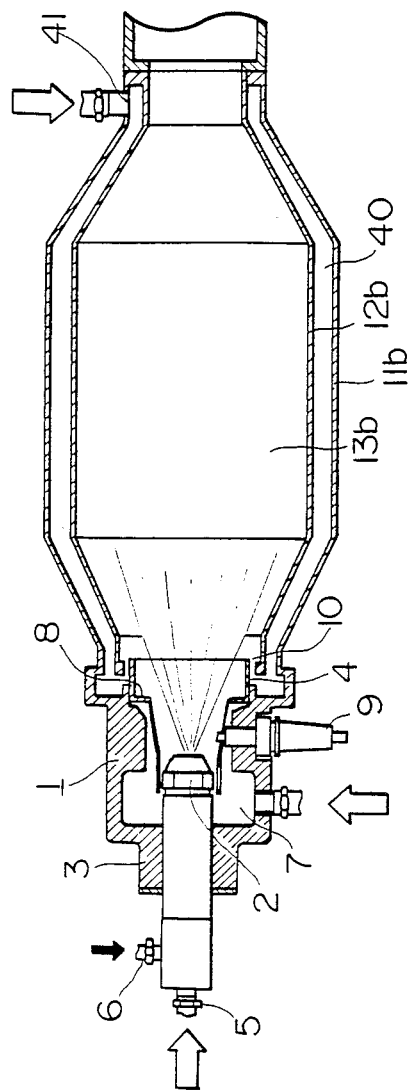
FIG. 4 is a view illustrating a combustion chamber in a third embodiment, in cross-section.

A third embodiment is described below with reference to FIG. 4 where similar members as those in the first embodiment are denoted by the same reference numerals. In this embodiment, a combustion chamber 13b has a dual structure comprising an outer sleeve 11b, an inner sleeve 12b, and a space formed between the outer sleeve 11b and the inner sleeve-12b which serves as an intake air passage 40. An intake air connection portion 41 is provided on the side of the intake air passage 40 near the preheated gas inlet 15 of the four-way valve 16, and the other side communicates with the intake air inlet 10. During regeneration, the combustion is started in the burner 1 so as to form a flame which starts to heat the inner sleeve 12b. At the same time, the intake air flows through the intake air passage 40 while cooling the inner sleeve 12b. This air then passes into the combustion chamber 13b from the intake air inlet 10, is mixed with the flame, and is sent as a preheated gas at a given temperature to the filter element to be regenerated. In this embodiment, the temperature of the preheated gas is kept at 600° C.

When the combustion chamber 13b of this embodiment is used, the fuel consumption of the burner in a stationary state is smaller than that immediately after the ignition, resulting in a smaller amount of fuel being consumed than in the first embodiment. In addition, the temperature of the outer sleeve 11b is increased 50° C. or less by the combustion of the burner. This is because no heat of combustion of the burner is unnecessarily used for heating the thermal insulators. Therefore, the heat of the burner is most efficiently used for heating the filter elements, and thus produces a remarkable thermal insulation effect.

The present invention provides an effective purifier which uses two filter elements during normal operation of an engine and thus allows the engine to be operated with very low back pressure, ensures a high engine efficiency, and prevents emission of any gas not purified during regeneration of the filter elements. In addition, since the exhaust gas from the engine is isolated from the preheated gas from a burner by a four-way valve during regeneration, the exhaust gas does not need to be heated. Furthermore, since each of the filter elements is made of fiber ceramics having a small heat capacity, the size of the burner and the fuel consumption can be greatly reduced.

What is claimed is:

1. An exhaust gas purifier system for connection to an exhaust pipe of a diesel engine for filtering off diesel particulates contained in exhaust gas and incinerating said particulates by means of an oil burner, comprising:

a four-way valve having a cylindrically shaped body with two gas inlets and two gas outlets, one of said inlets being connectable to the exhaust pipe of the diesel engine and the other of said inlets being connectable to a combustion chamber of the oil burner, said valve including a movable shaft disposed therein having an elliptical vane, attached to said shaft, in sliding contact with a portion of the inner surface of said body between said gas inlets, each of said gas outlets being located between said gas inlets and in said portion of the inner surface with which said elliptical vane is in sliding contact;

two parallel filter elements made of ceramic; and means for connecting each of said filter elements to a corresponding one of said gas outlets.

2. An exhaust gas purifier system as defined in claim 1, wherein said elliptical vane includes slots provided in the periphery thereof, said vane comprising sealing rings disposed in said slots for contacting the surface of said body.

3. An exhaust gas purifier system as defined in claim 1, wherein each of said filter elements has a longitudinal axis and said means for connecting each of said filter elements to a corresponding gas outlet includes a pipe disposed at an angle to the longitudinal axis of each of said filter elements.

4. An exhaust gas purifier system as defined in claim 1, wherein said combustion chamber is defined by a housing connected to the other of said gas inlets of said valve.

5. An exhaust gas purifier system as defined in claim 4, further comprising a sleeve disposed around said housing, said sleeve acting as a thermal insulator for said combustion chamber.

6. An exhaust gas purifier system as defined in claim 5, wherein said sleeve includes an air inlet at one end thereof and said housing includes an air outlet disposed adjacent the other end of said sleeve, whereby air from said air inlet can be passed between said sleeve and said housing to said air outlet and then into the combustion chamber.

7. An exhaust gas purifier system as defined in claim 1, wherein each said filter element has a corrugated honeycomb structure and is made of a fiber ceramic obtained by sintering a composite material of heat-resistant fiber of aluminosilicate and clay.

* * * * *